US010585888B2

(12) United States Patent
Gulwani et al.

(10) Patent No.: US 10,585,888 B2
(45) Date of Patent: Mar. 10, 2020

(54) JOIN WITH PREDICTIVE MERGING OF MULTIPLE COLUMNS

(71) Applicant: Microsoft Technology Licensing, LLC, Redmond, WA (US)

(72) Inventors: Sumit Gulwani, Sammamish, WA (US); Daniel Adam Perelman, Seattle, WA (US); Ranvijay Kumar, Sammamish, WA (US); Euan Peter Garden, Bellevue, WA (US); Chairy Chiu Ying Cheung, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 563 days.

(21) Appl. No.: 15/299,404

(22) Filed: Oct. 20, 2016

(65) Prior Publication Data

US 2018/0113907 A1    Apr. 26, 2018

(51) Int. Cl.
*G06F 16/2453* (2019.01)
*G06F 16/25* (2019.01)
(Continued)

(52) U.S. Cl.
CPC .... *G06F 16/24544* (2019.01); *G06F 16/2455* (2019.01); *G06F 16/2456* (2019.01);
(Continued)

(58) Field of Classification Search
CPC ........... G06F 16/24544; G06F 16/2455; G06F 16/2456; G06F 16/24565; G06F 16/258; G06F 17/245
See application file for complete search history.

(56) References Cited

U.S. PATENT DOCUMENTS 6,553,371 B2    4/2003  Gutierrez-Rivas et al.
6,591,272 B1 *  7/2003  Williams ............... G06F 16/289
(Continued)

OTHER PUBLICATIONS

Acar, et al., "Efficient Discovery of Join Plans in Schemaless Data", In Proceedings of International Database Engineering & Applications Symposium, Sep. 16, 2009, pp. 1-11.
(Continued)

*Primary Examiner* — Alford W Kindred
*Assistant Examiner* — Lin Lin M Htay
(74) *Attorney, Agent, or Firm* — Alleman Hall Creasman & Tuttle LLP

(57) ABSTRACT

A computing device is provided, comprising a processor configured to select at least one pair of tuples of columns including a source tuple from a first table and a target tuple from a second table. For each pair, the processor may select one or more rows from the source tuple and elements of the target tuple. For each selected row, the processor may programmatically generate a script that, when performed on the source tuple, produces a value consistent with the target tuple. The processor may apply each script to other rows of the source tuple and determine that an output is in the target tuple. For each column of the target tuple, for the script with output that meets a matching criterion, the processor may convey the output and, in response to a signal accepting the script, join the tables at least in part by performing each accepted script.

19 Claims, 6 Drawing Sheets

(51) Int. Cl.
*G06F 16/2455* (2019.01)
*G06F 17/24* (2006.01)
(52) U.S. Cl.
CPC ...... *G06F 16/24565* (2019.01); *G06F 16/258* (2019.01); *G06F 17/245* (2013.01)

(56) References Cited

U.S. PATENT DOCUMENTS

| | | | |
|---|---|---|---|
| 7,350,192 | B2 | 3/2008 | Seitz et al. |
| 7,574,652 | B2 | 8/2009 | Lennon et al. |
| 8,126,900 | B1 | 2/2012 | Kostamaa et al. |
| 8,538,934 | B2 | 9/2013 | Hudis et al. |
| 8,726,177 | B2 | 5/2014 | Zeringue et al. |
| 9,116,940 | B1 | 8/2015 | Gupta et al. |
| 9,400,639 | B2 | 7/2016 | Kalai et al. |
| 9,507,824 | B2 | 11/2016 | Young et al. |
| 2005/0060292 | A1 | 3/2005 | Day et al. |
| 2005/0060647 | A1 | 3/2005 | Doan et al. |
| 2006/0282429 | A1 | 12/2006 | Hernandez-sherrington et al. |
| 2008/0208855 | A1 | 8/2008 | Lingenfelder et al. |
| 2008/0288444 | A1 | 11/2008 | Edwards et al. |
| 2009/0327208 | A1 | 12/2009 | Bittner et al. |
| 2011/0302553 | A1 | 12/2011 | Gulwani |
| 2011/0320433 | A1 | 12/2011 | Mohiuddin et al. |
| 2012/0005190 | A1* | 1/2012 | Faerber ............... G06F 16/2433 707/718 |
| 2013/0166598 | A1* | 6/2013 | Vaitheeswaran ...... G06F 16/256 707/792 |
| 2013/0297661 | A1 | 11/2013 | Jagota |
| 2013/0311443 | A1 | 11/2013 | Bolotnikoff et al. |
| 2014/0236880 | A1 | 8/2014 | Yan et al. |
| 2014/0344399 | A1* | 11/2014 | Lipstone ............... H04L 41/509 709/217 |
| 2014/0344400 | A1* | 11/2014 | Varney ................. H04L 45/745 709/217 |
| 2015/0242407 | A1 | 8/2015 | Frohock et al. |
| 2015/0242409 | A1 | 8/2015 | Frohock et al. |
| 2015/0324346 | A1 | 11/2015 | Sankaran et al. |
| 2016/0055205 | A1 | 2/2016 | Jonathan et al. |
| 2016/0055212 | A1 | 2/2016 | Young et al. |
| 2016/0171049 | A1 | 6/2016 | Hill |
| 2016/0224626 | A1 | 8/2016 | Robichaud et al. |

OTHER PUBLICATIONS

"Understanding Automatic Joins", Retrieved on: Sep. 14, 2016 Available at: http://support.sas.com/documentation/cdl/en/etlug/62233/HTML/default/viewer.htm#n051a3fqzt822kn1xn1rxe2gu6tf.htm.

He, et al., "SEMA-JOIN: Joining Semantically-Related Tables using Big Table Corpora" In Proceedings of Very Large Database Endowment, vol. 8, Issue 12, Aug. 31, 2015, pp. 1358-1369.

Singh, et al., "Transforming Spreadsheet Data Types using Examples" In Proceedings of the 43rd Annual ACM SIGPLAN-SIGACT Symposium on Principles of Programming Languages, Jan. 20, 2016, pp. 343-356.

Data Discovery Guide, Retrieved from: «https://kb.informatica.com/proddocs/Product%20Documentation/5/IN_101_DataDiscoveryGuide_en.pdf», Jun. 2016, 199 Pages.

"International Search Report and Written Opinion Issued in PCT Application No. PCT/US2017/056443", dated Feb. 26, 2018, 13 Pages.

"International Search Report and Written Opinion Issued in PCT Application No. PCT/US2017/056444", dated Feb. 26, 2018, 10 Pages.

Sarawagi, S. et al., "Efficient set joins on similarity predicates," Proceedings of the 2004 ACM SIGMOD international conference on Management of data (SIGMOD '04), Jun. 13, 2004, Paris, France, 12 pages.

Jestes, J. et al., "Probabilistic String Similarity Joins," Proceedings of the 2010 ACM SIGMOD International Conference on Management of data (SIGMOD '10), Jun. 6, 2010, Indianapolis, Indiana, 12 pages.

"About joining tables," ACL Online User Guide, Available Online at https://docs.acl.com/acl/11/index.jsp?topic=%2Fcom.acl.user_guide.help%2Fda_combining_data%2Fc_about_joining_tables.html, Available as Early as Jan. 1, 2015, Retrieved Sep. 16, 2016, 4 pages.

Heer, J. et al., "Predictive Interaction for Data Transformation," Proceedings of the 7th Biennial Conference on Innovative Data Systems Research (CIDR 2015), Jan. 4, 2015, Asilomar, California, 7 pages.

Singh, R. et al., "Predicting a Correct Program in Programming by Example," In Computer Aided Verification, vol. 9206 of the series Lecture Notes in Computer Science, Jul. 16, 2015, 17 pages.

"Joining Tables," Zoho Reports Website, Available Online at https://www.zoho.com/reports/help/table/joining-tables.html, Available as Early as Apr. 19, 2016, Retrieved Sep. 16, 2016, 5 pages.

"Non Final Office Action Issued in U.S. Appl. No. 15/299,388", dated Nov. 14, 2018, 16 Pages.

"Final Office Action Issued in U.S. Appl. No. 15/299,363", dated Jun. 5, 2019, 21 Pages.

"Non-Final Office Action Issued in U.S. Appl. No. 15/299,363", dated Feb. 8, 2019, 20 Pages.

* cited by examiner

JOIN WITH PREDICTIVE MERGING OF MULTIPLE COLUMNS

BACKGROUND

When using computer programs that involve the manipulation of tables of data, joining two tables is a common task for a user to perform. If one of the two tables contains data that is contained in the other table in a different number of columns, it becomes time-consuming and cumbersome for the user to write a script to join them. These challenges, the manner in which they are addressed, and the attendant potential beneficial technical effects thereof are further discussed below.

SUMMARY

According to one aspect of the present disclosure, a computing device for computing join potential between a first table and a second table is provided, comprising a processor configured to select at least one pair of tuples of columns. Each pair may include a source tuple of a plurality of columns from a plurality of source columns of the first table and a target tuple of at least one column from one or more target columns of the second table. For each pair, the processor may be configured to select one or more rows, wherein each selected row includes an element from each column of the source tuple. The processor may be further configured to select one or more elements of at least one column of the target tuple. For each selected row, the processor may generate an example that includes the selected row and the one or more selected elements. For each example, the processor may, based on the example, programmatically generate a script that, when performed on the source tuple of the selected pair of tuples of the example, produces a value that is consistent with the target tuple of the example. For each script, the processor may apply that script to other rows of the source tuple and determine that an output generated by that script is in the target tuple. For each column of the target tuple, for the script for which the generated output meets a selected matching criterion when compared to the elements of that column, the processor may be configured to convey the output generated by that script for display on a display device. In response to an input signal accepting the conveyed script, the processor may perform a join operation on the two tables at least in part by performing each of the accepted scripts on the source columns.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
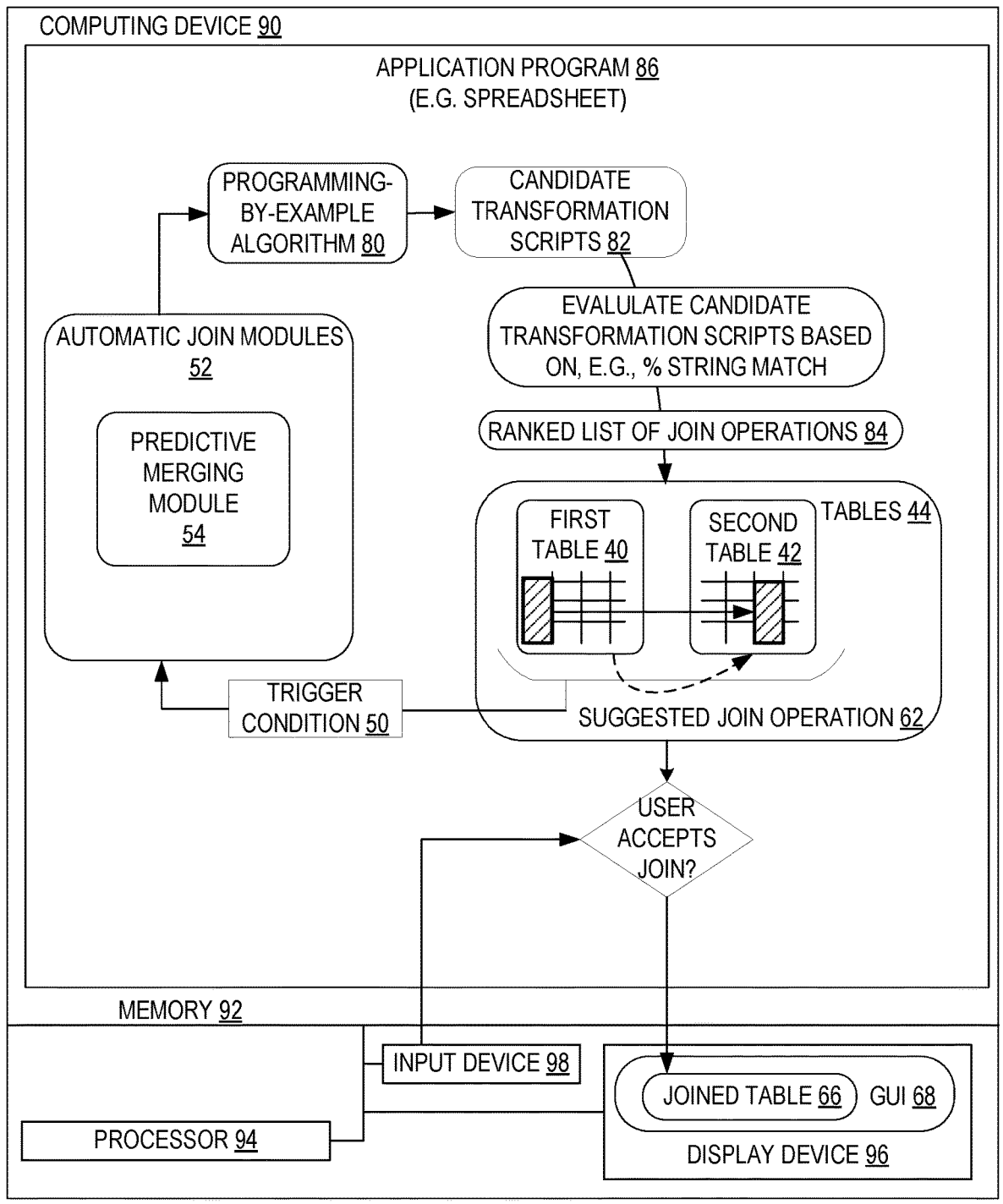
FIG. 1 shows a computing device equipped with a predictive merging module that programmatically computes the join potential between at least two tables, according to one embodiment of the present disclosure.

FIG. 1 illustrates a computing device 90, comprising memory 92, a processor 94, a display device 96, and an input device 98. The processor 94 configured to execute an application program 86, contained in the memory 92, that computes a join potential between two tables 44, according to one embodiment of the present disclosure. The processor may be configured to compute join potential between the first table 40 and the second table 42 in response to detecting a trigger condition 50. The application program 86, for example, may be a spreadsheet application program, and the trigger condition 50, for example, may be a user selecting a "search for potential joins" option in the spreadsheet application program 86, or may be a programmatic trigger that causes the application program 86 itself to search for potential joins among tables 44 without requiring user input.

The computing device 90 executes an automatic join module 52 on a first table 40 and a second table 42. The automatic join module 52 includes a predictive merging module 54. The predictive merging module 54 programmatically generates at least one candidate transformation script 82. A script is a set of programmatic instructions to be executed by a computing device 90. The processor 94 may be configured to programmatically generate the script 82 using a programming-by-example algorithm 80. The predictive merging module 54 then evaluates the at least one candidate transformation script 82 and produces a ranked list of join operations 84. At least one suggested join operation 62 from the ranked list of join operations 84 is then conveyed to the user for display on the display device 96. If the user accepts one of the suggested join operations 62, the application program 86 joins the tables 44 into a joined table 66, which is displayed in a graphical user interface 68 on display device 96.

Figure 2:
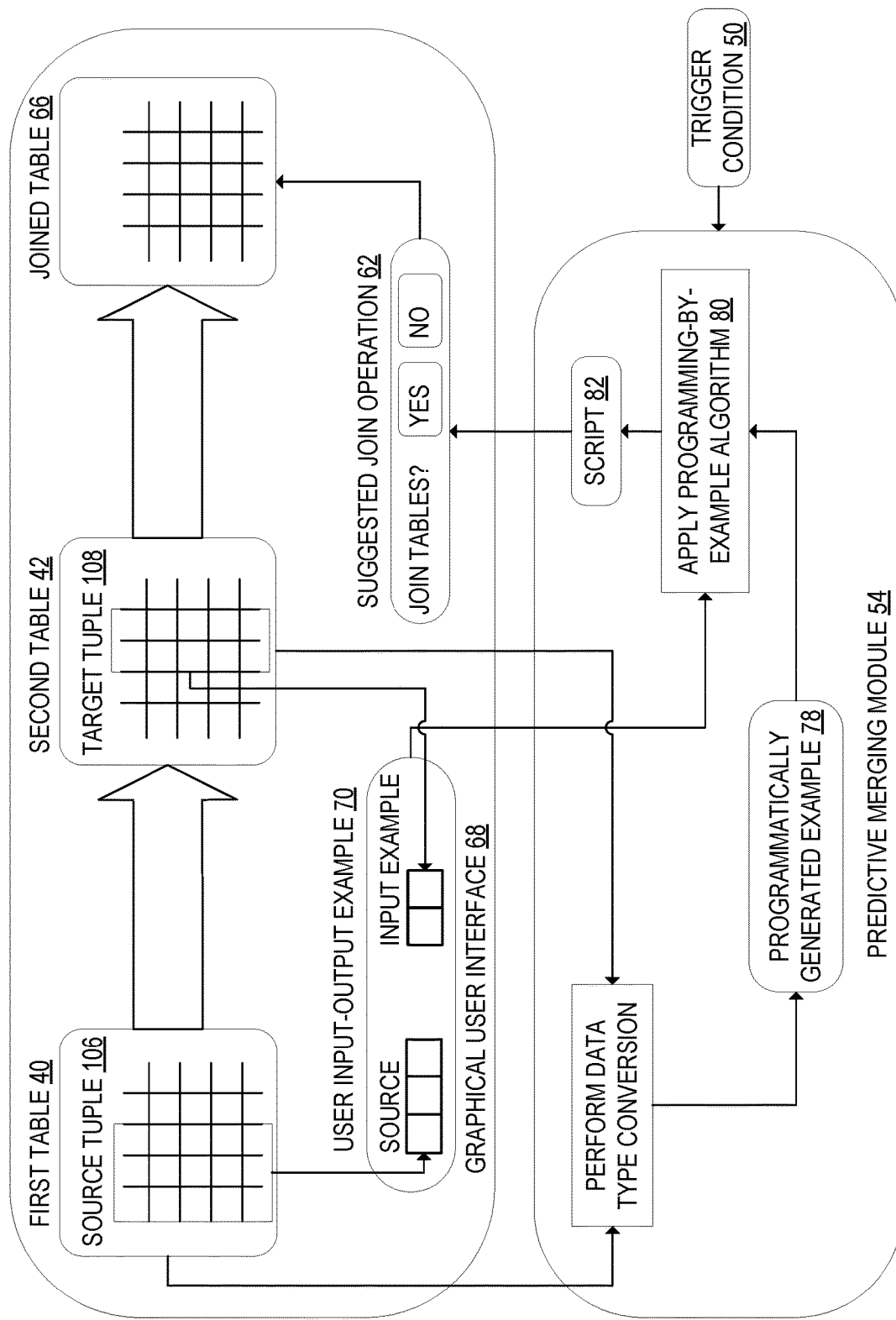
FIG. 2 shows the predictive merging module of FIG. 1 and the graphical user interface with which a user inputs data into and views data output by the predictive merging module.

FIG. 2 illustrates the predictive merging module 54 and the graphical user interface 68. The predictive merging module 54 computes join potential between a first table 40 and a second table 42. The predictive merging module 54 may compute join potential between the first table 40 and the second table 42 in response to detecting a trigger condition 50. From these two tables 44, the predictive merging module 54 selects at least one pair 110 of tuples of columns. Each pair 110 includes a source tuple 106 of a plurality of columns from a plurality of source columns of the first table 40 and a target tuple 108 of at least one column from one or more target columns of the second table 42. The target tuple 108 may include a plurality of target columns.

For each pair, the predictive merging module 54 selects one or more rows, wherein each selected row includes elements from each column of the source tuple 106. The predictive merging module 54 also selects one or more elements of at least one column of the target tuple 108. The process by which the predictive merging module 54 selects one or more elements of at least one column of the target tuple 108 is described below.

The predictive merging module 54 compares the data in the elements of the one or more selected rows of the source tuple 106 to the data in the elements of the target tuple 108. In order for the predictive merging module 54 to directly compare the elements of the source tuple 106 and the target tuple 108, the predictive merging module 54 may convert the elements of the tuples into a common data type. The predictive merging module 54 may normalize the elements of the columns of at least one of the source tuple 106 and the target tuple 108 so that they have the same data type as the elements of the columns of the other. This normalization may be made at least in part by converting the elements into converted strings. After converting the elements into converted strings, the predictive merging module 54 may further modify the elements by, for example, removing leading or trailing whitespace or leading zeroes, and/or by upper/lower-case normalization.

Converting the elements to strings, rather than to some other data type, offers some advantages. First, strings can contain any type of characters, whereas other data types such as integer can only contain certain character types. Also, strings can be divided into substrings that still have the string data type. These substrings can be compared directly to each other. Thus, converting the elements in the source tuple 106 and the elements in the target tuple 108 to strings allows the contents of the elements to be compared even if the elements did not initially share a data type.

Once the elements of the columns of the source tuple 106 and the target tuple 108 have been converted into converted strings, the predictive merging module 54 may compare the elements of the source tuple 106 and the target tuple 108 by determining whether the elements of the source tuple 106 have the same format as elements of the target tuple 108. The predictive merging module 54 selects one or more elements of at least one column of the target tuple 108. The predictive merging module 54 may make this selection at least in part by determining one or more elements of at least one column of the target tuple 108 that have the same format as an element of the selected row of the source tuple. The format of the elements of the selected row of the source tuple 106 and the at least one column of the target tuple 108 may be selected from the group consisting of string representations of formats associated with number, date, time, name, address, email address, and distance.

In addition to comparing the elements of the selected row of the source tuple 106 to the elements of the target tuple 108 by determining that they have the same format, the predictive merging module may also determine a longest substring match between at least one element of the selected row of the source tuple 106 and at least one element of the target tuple 108. The predictive merging module 54 may select one or more elements of at least one column of the target tuple 108 at least in part by determining one or more elements of at least one column of the target tuple 108 that share a longest substring match with an element of the selected row of the source tuple 106.

Once a row of the source tuple and one or more elements of at least one column of the target tuple 108 have been selected, the predictive merging module generates an example 78 for each selected row that includes the selected row of the source tuple 106 and the one or more selected elements of the target tuple 108.

The predictive merging module 54 of the present disclosure may make use of programming by example. Programming by example is a programming technique by which a script is generated from an example of the desired output of such a script. For example, programming by example is used in the flash-fill feature of Microsoft Excel 2016. In the programming by example techniques employed herein, the example may be input by a user or may be programmatically generated by predictive merging module 54.

Figure 3:
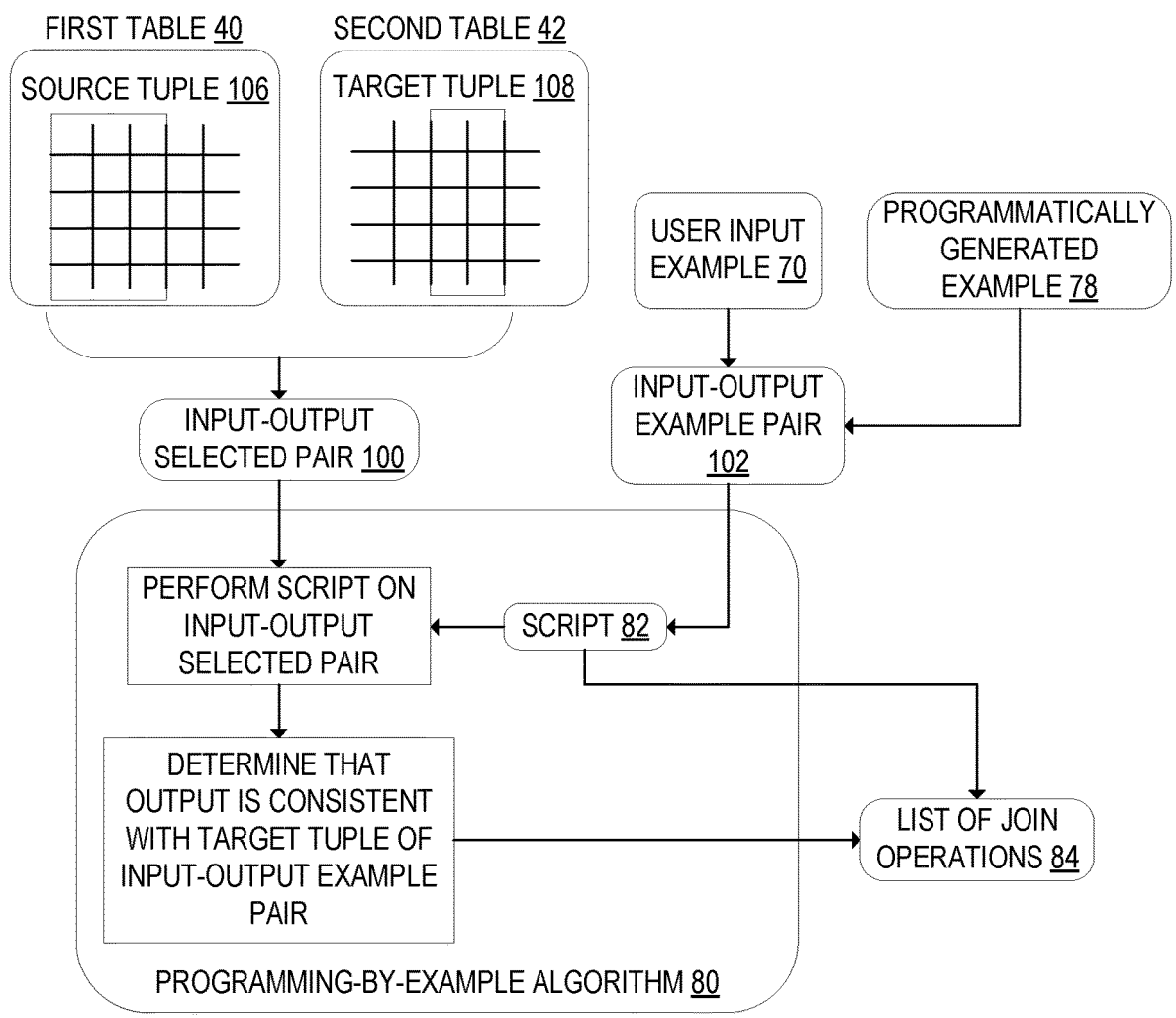
FIG. 3 shows the programming-by-example algorithm of FIG. 3 and its inputs and outputs.

FIG. 3 illustrates the programming-by-example algorithm 80 according to one embodiment of the present disclosure. First, the predictive merging module 54 may input an input-output example pair 102 into a programming-by-example algorithm 80. The input-output example pair 102 may be a programmatically generated example 78 or a user input example 70. For each input-output example pair 102 generated by the method described above, the predictive merging module 54 may programmatically generate a script 82 that, when performed on the source tuple 106 of an input-output selected pair 100, produces a value that is consistent with the target tuple 108 of the input-output example pair 102. The input-output selected pair 100 includes the source tuple 106 of the first table 40 and the target tuple 108 of the second table 42.

Once the programming-by-example algorithm 80 has generated a script 82, then for each script 82, the predictive merging module 54 may apply that script 82 to other rows of the source tuple 106 and determine that an output generated by that script 82 is in the target tuple 108. The predictive merging module 54 may determine a script 104 of the plurality of scripts 82 for which the generated output meets a selected matching criterion when compared to the elements in the one or more target columns. The predictive merging module 54 may use a matching criterion such as a string distance metric, for example, a comparison of substring length. The predictive merging module 54 may make this determination at least in part by determining that most elements in the generated output belong to the one or more target columns.

The predictive merging module 54 may also determine a script 104 of the plurality of scripts 82 for which the generated output meets a selected matching criterion when compared to the elements in the one or more target columns at least in part by determining a relative coverage of the elements in the one or more target columns. The relative coverage is the proportion of outputs of a script 82 that match the elements of the one or more target columns.

If many of the outputs of a script 82 belong to the target column, the script 82 may be added to a list of join operations 84. The scripts in the list of join operations 84 may be ranked by probability of producing a successful join operation and displayed to the user.

In place of the programmatically generated example 78, the programming-by-example algorithm 80 may instead use a user input example 70 to generate the script 82. The input-output example pair 102 may be input by a user or may be programmatically determined.

For each column of the target tuple 108, for the script 104 for which the generated output meets a selected matching criterion when compared to the elements of that column, the predictive merging module 54 displays the output generated by that script 82 to a user as a suggested join operation 62 in the graphical user interface 68. The outputs of the scripts 104 for which the generated outputs most closely match the elements of the columns of the target tuple 108 may be displayed to the user in one joined table 66. The outputs of lower-ranking scripts may also be displayed to the user as suggested join operations 62. In response to the user accepting the displayed script 104, the predictive merging module 52 performs a join operation on the two tables 44 at least in part by performing each of the displayed scripts 82 on the source columns.

The predictive merging module 54 may generate a profile for each column in the first table 40 and each column in the second table 42, wherein the profile of each column includes one or more of a minimum string length, maximum string length, mean string length, data types of the elements of the column, and delimiters contained within the elements of the column. In addition, the predictive merging module 54 may generate the profiles at least in part by converting the elements of each column of the first table 40 and each column of the second table 42 into converted strings. The predictive merging module 54 may use the profiles of each column in the first table 40 and each column in the second table 42 to determine a probability of a successful join operation between the columns. For example, the predictive merging module 54 may determine that the probability of a successful join operation is high if the union of entities in the profiles of the columns of the source tuple 106 matches the union of entities in the profiles of the columns of the target tuple 108.

The use of column profiles to determine the probability of successful join operations between columns can allow the predictive merging module 54 to compute the join potential of tables 44 more quickly. By comparing column profiles, the predictive merging module 54 may rule out pairs 110 of tuples with low join potential without having to apply programming by example to every possible pair 110 of tuples. Since column profiles may be determined and compared more quickly than joined tables 66, the use of column profiles can save computing time when determining the probability of successful join operations between columns.

The predictive merging module 54 may programmatically pre-compute one or more possible join operations. When the predictive merging module 54 performs a join operation, the performed join operation is one of the one or more possible join operations.

An example use of the present disclosure is provided below. In this example, the predictive merging module 54 joins two tables 44 of information about the times and dates of events. The columns of the first table 40 are Event Id (integer), Date (integer), Month (char 3), Year (char 4). Time (string), TimeZone (string) and Event Description (string). The columns of the second table are Event Id (integer), Event Time (string), and Event Description (string).

| Event Id (integer) | Date (integer) | Month (char 3) | Year (char 4) | Time (string) | Time-Zone (string) | Event Description (string) |
|---|---|---|---|---|---|---|
| 1 | 03 | Jan | 2008 | 07:50:00 | GMT | Event 1 at location 1 |
| 2 | 03 | Jan | 2008 | 07:55:00 | GMT | Event 2 at location 1 |

| Event Id (integer) | Event Time (string) | Event Description (string) |
|---|---|---|
| 4 | 01/03/2008 07:50:00 GMT | Event 4 at location 2 |
| 5 | 01/03/2008 07:55:00 GMT | Event 5 at location 2 |

In this example, the predictive merging module 54 may identify a pair 110 of tuples based on the profiles of the columns of each table. For example, the predictive merging module 54 may determine that if the Time (string) column of the first table 40 is in the source tuple 106, the Event Time (string) column of the second table 42 is likely to be in the target tuple 108, because the elements of both columns have the data type "string" and include two ":" delimiters. In this example, the source tuple 106 includes the Date (integer), Month (char 3), Year (char 4), Time (string), and TimeZone (string) columns of the first table 40. The target tuple 108 includes the Event Time (string) column of the second table 42.

Next, the predictive merging module 54 may select a row of the source tuple 106, in this example the first row. In order to determine which element or elements of target tuple 108 to select, the predictive merging module 54 may convert the elements of the columns of the source tuple 106 and the target tuple 108 into converted strings. The predictive merging module 54 may then determine that the elements of the Event Time (string) column of the second table 42 contain string representations of both the "date" format and the "time" format. The predictive merging module 54 may determine that the elements of the Time (string) column of the first table also contain string representations of the "time" format.

The predictive merging module 54 may determine, for each element of the selected row of the source tuple 106, which element of the target column of the target tuple 108 shares a longest substring match with that element. The first element of the Date (integer) column of the first table 40 shares a longest substring, "03." with both the first and second elements of the target column. The first element of the Month (char 3) column of the first table 40 does not share a substring with either element of the target column. The first element of the Year (char 4) column shares a longest substring, "2008," with both elements of the target column. The first element of the Time (string) shares a longest substring, "07:50:00," with the first element of the target column. The first element of the TimeZone (string) column shares a longest substring with both elements of the target column. Since the first element of the Time (string) column of the first table 40 shares a longest substring with the first element of the Event. Time (string) column of the second table 42, whereas the first elements of the other columns of the selected row of the source tuple 106 share longest substrings with both or neither of the elements of the Event Time (string) column, the predictive merging module 54 selects the first element of the Event Time (string) column.

The predictive merging module 54 generates an example 78 that includes the selected row of the source tuple 106 and the selected element of the target tuple 108. This example 78 may be used as the input-output example pair 102 by the programming-by-example algorithm 80. The programming-by-example algorithm 80 may generate a script 82 that, when performed on the source tuple 106 of an input-output selected pair 100, produces a value that is consistent with the target tuple of the example the input-output example pair 102. The selected pair 110 of tuples is used as the input-output selected pair 100.

Next, the predictive merging module 54 applies the generated script 82 to the other row of the source tuple 106 and determines that the output of the script is in the target tuple 108. In this example, the output matches the second element of the Event Time (string) column of the second table 42. Since the output of the script 82 matches the second element of the Event Time (string) column, that script 82 is the script 104 with output that meets a selected matching criterion when compared to the elements of the target tuple 108. In this example, the selected matching criterion is sharing a longest substring match.

The predictive merging module 54 displays the output of the script 82 to the user. Since the target tuple 108 includes only one column, the predictive merging module 54 only displays the output of one script 104 to the user. If the user accepts the displayed output, the predictive merging module performs a join operation on the two tables in part by performing the script 104 on the source columns. The joined table 66 is shown below.

| Event Id (integer) | Date (integer) | Month (char 3) | Year (char 4) | Time (string) | TimeZone (string) | Event Description (string) | Event Id (integer) | Event Time (string) | Event Description (string) |
|---|---|---|---|---|---|---|---|---|---|
| 1 | 03 | Jan | 2008 | 07:50:00 | GMT | Event 1 at location 1 | 4 | 01/03/2008 07:50:00 GMT | Event 4 at location 2 |
| 2 | 03 | Jan | 2008 | 07:55:00 | GMT | Event 2 at location 1 | 5 | 01/03/2008 07:55:00 GMT | Event 5 at location 2 |

Another example use of the present disclosure is provided below. In this example, the predictive merging module 54 joins two tables 44 of information about users' accounts. The columns of the first table 40 are User Id (integer), First Name (string). Last Name (string), and DOB (date). The columns of the second table 42 are Full Name (string), Opened On (date), and Cost Center (string).

| User Id (integer) | First Name (string) | Last Name (string) | DOB (date) |
|---|---|---|---|
| 1 | John | Smith | Jan. 1, 1980 |
| 2 | Jane | Doe | Feb. 1, 1980 |

| Full Name (string) | Opened On (date) | Cost Center (string) |
|---|---|---|
| John Smith | Jan. 1, 2015 | Bothell |
| Jane Doe | Feb. 3, 2015 | Bellevue |

The predictive merging module 54 may generate a profile for each column of the first table 40 and the second table 42. The predictive merging module 54 may then use the profiles of the columns to determine the probability of a successful join operation between two tuples 110 of columns. For example, the predictive merging module 54 may determine that the probability of a successful join operation between a source tuple 106 that contains the First Name (string) and Last Name (string) columns of the first table 40 and a target tuple 108 that contains the Full Name (string) column of the second table 42 is high. In this example, the probability is high because the union of entities in the profiles of the columns of the source tuple 106 matches the union of entities in the profiles of the columns of the target tuple 108. Using a source tuple 106 that includes the First Name (string) and Last Name (string) columns of the first table 40 and a target tuple 108 that includes the Full Name (string) column of the second table 42, the predictive merging module may produce the following joined table 66.

| User Id (integer) | First Name (string) | Last Name (string) | DOB (date) | Full Name (string) | Opened On (date) | Cost Center (string) |
|---|---|---|---|---|---|---|
| 1 | John | Smith | Jan. 1, 1980 | John Smith | Jan. 1, 2015 | Bothell |
| 2 | Jane | Doe | Feb. 1, 1980 | Jane Doe | Feb. 3, 2015 | Bellevue |

Figure 4:
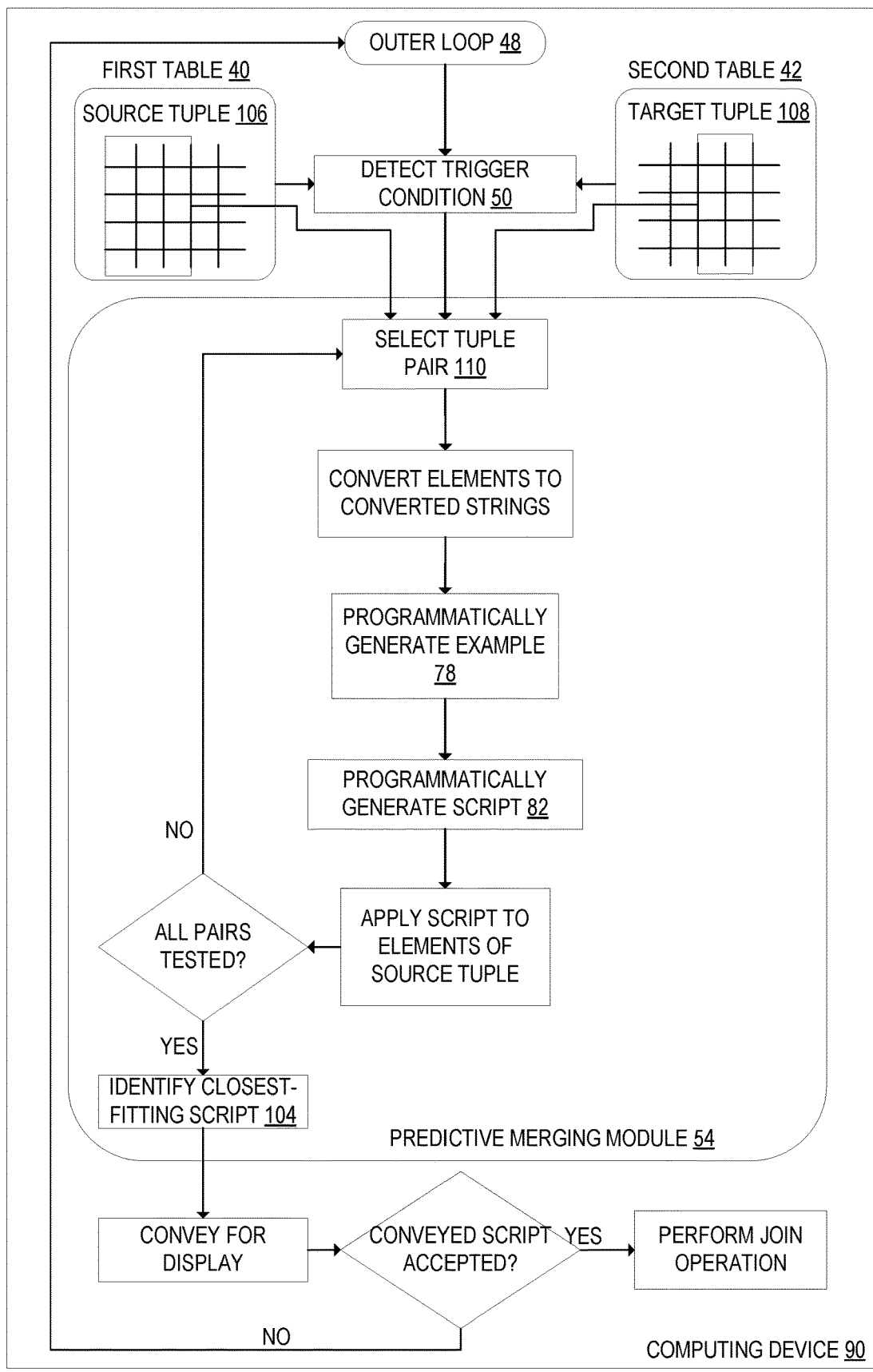
FIG. 4 is a flowchart of a method for programmatically computing the join potential between two tables, according to one embodiment of the present disclosure.

FIG. 4 illustrates a method for use with a computing device 90. In the method, the processor 94 computes join potential between a first table 40 and a second table 42. The processor 94 may be configured to compute join potential between the first table and the second table in response to detecting a trigger condition. Detecting the trigger condition 50 may cause the computing device 90 to exit an outer loop 48 and enter a predictive merging module 54. The predictive merging module 54 selects at least one pair 110 of tuples of columns, wherein each pair includes a source tuple 106 of a plurality of columns from a plurality of source columns of the first table 40 and a target tuple 108 of at least one column from one or more target columns of the second table 42.

For each pair 110 of tuples, the predictive merging module 54 selects one or more rows, wherein each selected row includes an element from each column of the source tuple 106. The predictive merging module 54 also selects one or more elements of at least one column of the target tuple 108.

In the process of selecting one or more elements of at least one column of the target tuple 108, the elements of the columns of at least one of the source tuple 106 and the target tuple 108 may be modified so that they have the same data type as the elements of the columns of the other. The predictive merging module 54 may normalize the elements at least in part by converting the elements into converted strings. The conversion of the elements into converted strings may be followed by applying one or more normalization transformations to at least one of the elements.

One or more elements of at least one column of the target tuple 108 may be selected at least in part by determining one or more elements of at least one column of the target tuple 108 that have the same format as an element of the selected row of the source tuple 106. One or more elements of at least one column of the target tuple 108 may also be selected at least in part by determining one or more elements of at least one column of the target tuple 108 that share a longest substring match with an element of the selected row of the source tuple 106.

For each selected row, the predictive merging module 54 generates an example 78 that includes the selected row of the source tuple 106 and the one or more selected elements of the target tuple 108. For each example 78, the predictive merging module 54 programmatically generates a script 82 based on the example 78. When performed on the source tuple 106 of the selected pair of tuples 110 of the example 78, the script 82 produces a value that is consistent with the target tuple 108 of the example 78. According to one embodiment of the present disclosure, the script 82 may be programmatically generated using a programming-by-example algorithm 80 by the method illustrated in FIG. 3 and described above. For each script 82, the predictive merging module applies that script 82 to other rows of the source tuple 106 and determines that an output generated by that script 82 is in the target tuple 108.

Once all the programmatically generated scripts 82 have been applied to the source tuple 106, the predictive merging module 54 then identifies the script 104 for each column of the target tuple 108 that generates the output most similar to that column. The script 104 of the plurality of scripts 82 for which the generated output meets a selected matching criterion when compared to the elements in the one or more target columns may be determined at least in part by determining that most elements in the generated output belong to the one or more target columns. The script 104 may also be determined by determining a relative coverage of the elements in the one or more target columns.

For each column of the target tuple 108, for the script 104 for which the generated output meets a selected matching criterion when compared to the elements of that column, the predictive merging module 54 displays the output generated by that script 104 to a user. In response a signal such as user input indicating that the user accepts the displayed script 104, the predictive merging module 54 performs a join operation on the two tables 44 at least in part by performing each of the displayed scripts 104 on the source columns.

The predictive merging module 54 may generate a profile for each column in the first table 40 and each column in the second table 42. The profile of each column may include one or more of a minimum string length, maximum string length, mean string length, data types of the elements of the column, and delimiters contained within the elements of the column. The profiles of each column in the first table 40 and each column in the second table 42 may be used to determine a probability of a successful join operation between the columns.

The predictive merging module 54 may programmatically pre-compute one or more possible join operations. The one or more possible join operations may be programmatically pre-computed without input from the user. If the predictive merging module 54 performs a join operation, the performed join operation may be one of the one or more possible join operations programmatically pre-computed by the predictive merging module 54.

Figure 5:
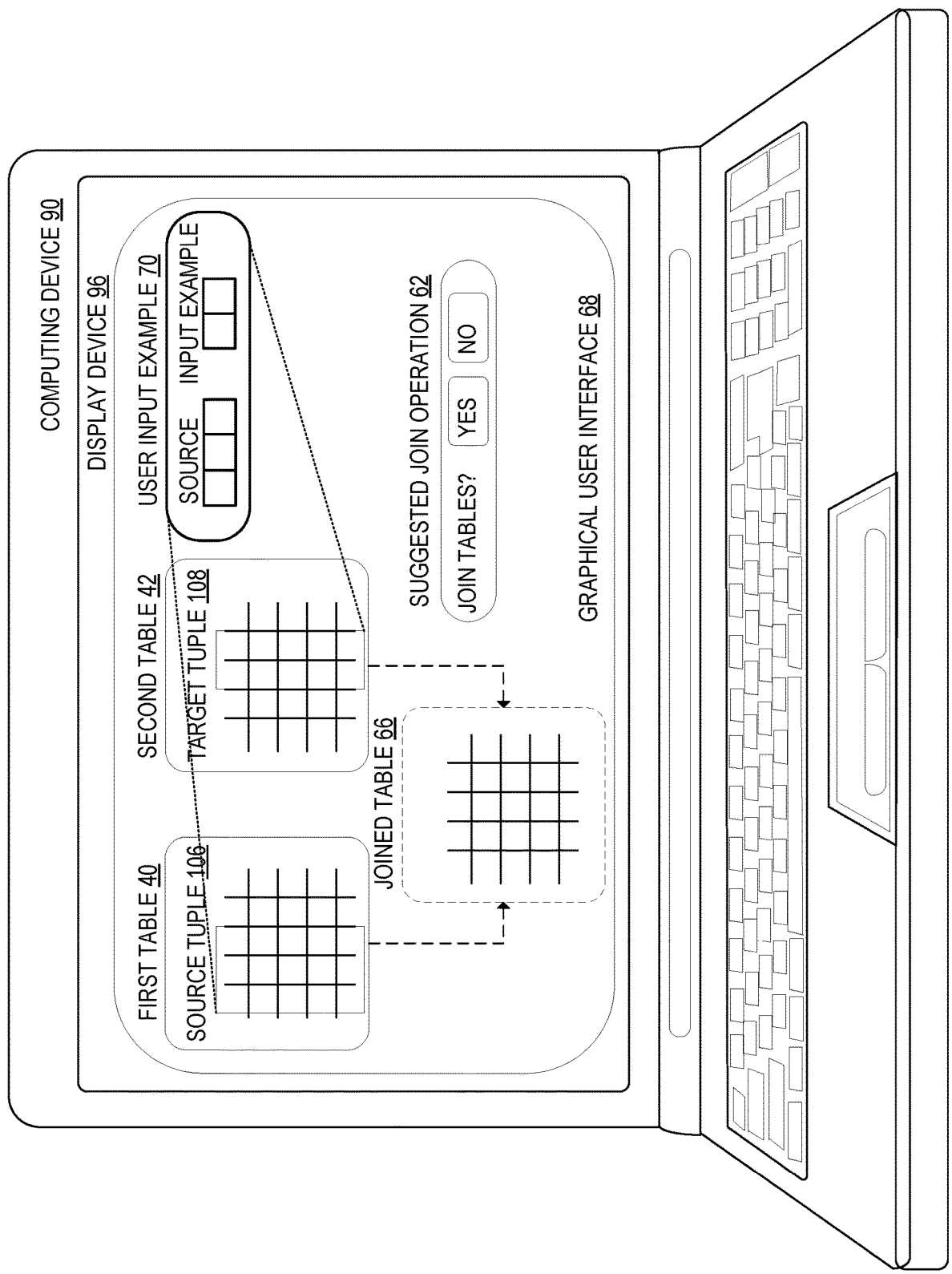
FIG. 5 shows an example computing device configured to execute an application program to compute the join potential between two tables, according to one embodiment of the present disclosure.

FIG. 5 illustrates an example computing device 90 configured to execute an application program 86 that computes the join potential between two tables 44. The computing device may include a display device 96 that displays a graphical user interface 68. The graphical user interface 68 may display at least a first table 40 and a second table 42. The graphical user interface 68 may also display a field into which the user can input a user input example 70 for use in programmatically generating a script 82. The user may input the user input example 70 by selecting a source row of a source tuple 106 and one or more target elements of a target tuple 108. The user input example 70 is used as an input-output selected pair 100. Using the input-output selected pair 100 and the input-output example pair 102, the programming-by-example algorithm 80 may produce at least one script 82 that, when applied to the input-output selected pair 100, produces the input-output example pair 102.

Once the predictive merging module 54 has generated at least one script 82 to join the tables 44, the graphical user interface 68 may display the joined table 66 output by at least one script 82 to the user as a suggested join operation 62. The graphical user interface may indicate that the joined table 66 has not yet been accepted or rejected by the user, for example by displaying it in a different color. The graphical user interface 68 may also display a prompt for the user to either accept or reject the join operation. If the user accepts the join operation, the predictive merging module 54 may perform the join operation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
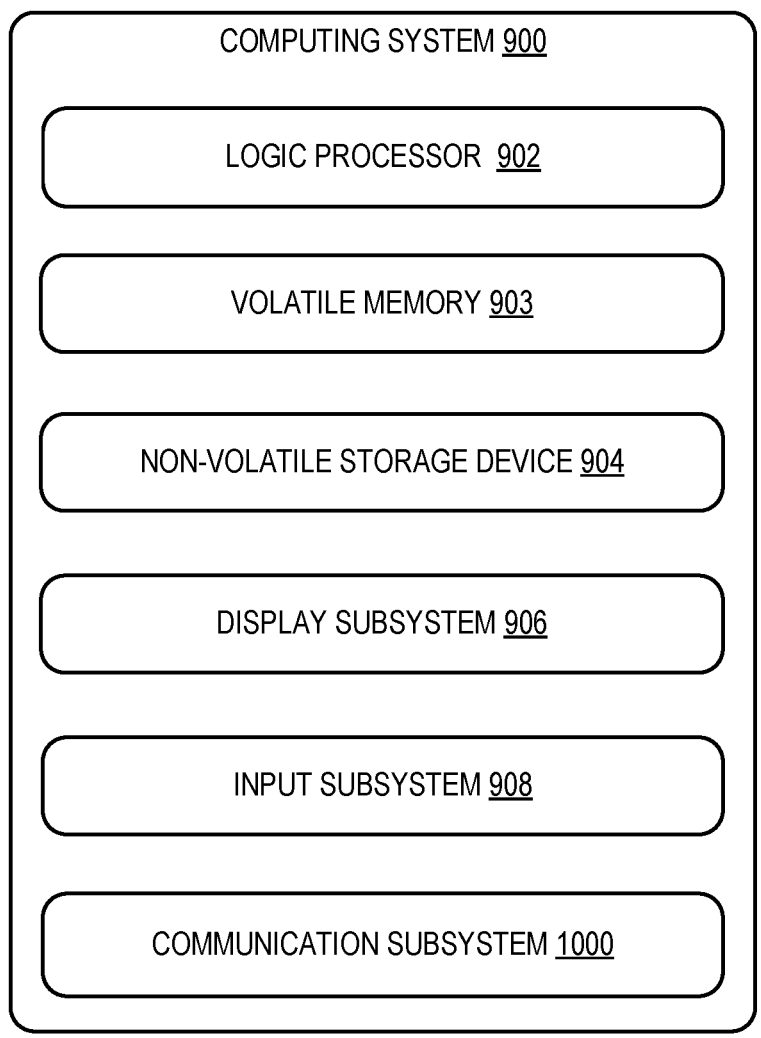
FIG. 6 shows an example computing system according to an embodiment of the present disclosure.

FIG. 6 schematically shows a non-limiting embodiment of a computing system 900 that can enact one or more of the methods and processes described above. Computing system 900 is shown in simplified form. Computing system 900 may embody the computing device 90 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to one aspect of the present disclosure, a computing device for computing join potential between a first table and a second table is provided, comprising a processor configured to select at least one pair of tuples of columns. Each pair includes a source tuple of a plurality of columns from a plurality of source columns of the first table and a target tuple of at least one column from one or more target columns of the second table. For each pair, the processor is configured to select one or more rows, wherein each selected row includes an element from each column of the source tuple, select one or more elements of at least one column of the target tuple, and for each selected row, generate an example that includes the selected row and the one or more selected elements. For each example, the processor programmatically generates a script based on the example that, when performed on the source tuple of the selected pair of tuples of the example, produces a value that is consistent with the target tuple of the example. For each script, the processor applies that script to other rows of the source tuple and determines that an output generated by that script is in the target tuple. For each column of the target tuple, for the script for which the generated output meets a selected matching criterion when compared to the elements of that column, the processor conveys the output generated by that script for display on a display device. In response to an input signal accepting the conveyed script, the processor performs a join operation on the two tables at least in part by performing each of the accepted scripts on the source columns.

In this aspect, the processor may be configured to compute join potential between the first table and the second table in response to detecting a trigger condition.

In this aspect, the processor may be configured to normalize the elements of the columns of at least one of the source tuple and the target tuple so that they have the same data type as the elements of the columns of the other, at least in part by converting the elements into converted strings.

In this aspect, the processor may be configured to select one or more elements of at least one column of the target tuple at least in part by determining one or more elements of at least one column of the target tuple that have the same format as an element of the selected row of the source tuple.

In this aspect, the format may be selected from the group consisting of string representations of formats associated with number, date, time, name, address, email address, and distance.

In this aspect, the processor may be configured to select one or more elements of at least one column of the target tuple at least in part by determining one or more elements of at least one column of the target tuple that share a longest substring match with an element of the selected row of the source tuple.

In this aspect, the processor may be configured to determine a script of the plurality of scripts for which the generated output meets a selected matching criterion when compared to the elements in the one or more target columns, at least in part by determining that most elements in the generated output belong to the one or more target columns and by determining a relative coverage of the elements in the one or more target columns.

In this aspect, the processor may be configured to programmatically generate the script using a programming-by-example algorithm.

In this aspect, the target tuple may include a plurality of target columns.

In this aspect, the processor may be configured to generate a profile for each column in the first table and each column in the second table. The profile of each column may include one or more of a minimum string length, maximum string length, mean string length, data types of the elements of the column, and delimiters contained within the elements of the column. The processor may be configured to use the profiles of each column in the first table and each column in the second table to determine a probability of a successful join operation between the columns.

In this aspect, the processor may be configured to programmatically pre-compute one or more possible join operations. The performed join operation may be one of the one or more possible join operations.

In this aspect, the outputs of the scripts for which the generated outputs meet a selected matching criterion when compared to the elements of the columns of the target tuple may be conveyed in one joined table.

According to another aspect of the present disclosure, a method for use with a computing device for computing join potential between a first table and a second table is provided, comprising selecting at least one pair of tuples of columns. Each pair includes a source tuple of a plurality of columns from a plurality of source columns of the first table and a target tuple of at least one column from one or more target columns of the second table. For each pair, one or more rows are selected, wherein each selected row includes an element from each column of the source tuple, one or more elements of at least one column of the target tuple are selected, and for each selected row, an example is generated that includes the selected row and the one or more selected elements. For each example, a script based on the example is programmatically generated that, when performed on the source tuple of the selected pair of tuples of the example, produces a value that is consistent with the target tuple of the example. For each script, that script is applied to other rows of the source tuple and it is determined that an output generated by that script is in the target tuple. For each column of the target tuple, for the script for which the generated output meets a selected matching criterion when compared to the elements of that column, the output generated by that script is conveyed for display on a display device. In response to an input signal accepting the conveyed script, a join operation is performed on the two tables at least in part by performing each of the accepted scripts on the source columns.

In this aspect, the elements of the columns of at least one of the source tuple and the target tuple may be normalized so that they have the same data type as the elements of the columns of the other, at least in part by converting the elements into converted strings.

In this aspect, one or more elements of at least one column of the target tuple may be selected at least in part by determining one or more elements of at least one column of the target tuple that have the same format as an element of the selected row of the source tuple.

In this aspect, one or more elements of at least one column of the target tuple may be selected at least in part by determining one or more elements of at least one column of the target tuple that share a longest substring match with an element of the selected row of the source tuple.

In this aspect, a script of the plurality of scripts may be determined for which the generated output meets a selected matching criterion when compared to the elements in the one or more target columns, at least in part by determining that most elements in the generated output belong to the one or more target columns and by determining a relative coverage of the elements in the one or more target columns.

In this aspect, a profile may be generated for each column in the first table and each column in the second table. The profile of each column may include one or more of a minimum string length, maximum string length, mean string length, data types of the elements of the column, and delimiters contained within the elements of the column. The profiles of each column in the first table and each column in the second table may be used to determine a probability of a successful join operation between the columns.

In this aspect, one or more possible join operations may be programmatically pre-computed. The performed join operation may be one of the one or more possible join operations.

According to another aspect of the present disclosure, a computing device for computing join potential between a first table and a second table is provided, comprising a processor configured to select at least one pair of tuples of columns. Each pair includes a source tuple of a plurality of columns from a plurality of source columns of the first table and a target tuple of at least one column from one or more target columns of the second table. The processor normalizes the elements of the columns of at least one of the source tuple and the target tuple so that they have the same data type as the elements of the columns of the other, at least in part by converting the elements into converted strings. For each pair, the processor is configured to select one or more rows, wherein each selected row includes an element from each column of the source tuple, select one or more elements of at least one column of the target tuple, and for each selected row, generate an example that includes the selected row and the one or more selected elements. For each example, the processor programmatically generates a script based on the example that, when performed on the source tuple of the selected pair of tuples of the example, produces a value that is consistent with the target tuple of the example. For each script, the processor applies that script to other rows of the source tuple and determines that an output generated by that script is in the target tuple. For each column of the target tuple, for the script for which the generated output meets a selected matching criterion when compared to the elements of that column, the processor conveys the output generated by that script for display on a display device. The outputs of the scripts for which the generated outputs meet a selected matching criterion when compared to the elements of the columns of the target tuple are conveyed in one joined table. In response to an input signal accepting the conveyed script, the processor performs a join operation on the two tables at least in part by performing each of the accepted scripts on the source columns.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for computing join potential between a first table and a second table, comprising:
    a processor configured to:
        select at least one pair of tuples of columns, wherein each pair includes a source tuple of a plurality of columns from a plurality of source columns of the first table and a target tuple of at least one column from one or more target columns of the second table;
        for each pair:
            select one or more rows, wherein each selected row includes an element from each column of the source tuple;
            select one or more elements of at least one column of the target tuple;
            for each selected row, generate an example that includes the selected row and the one or more selected elements;
            for each example, based on the example programmatically generate a script that, when performed on the source tuple of the selected pair of tuples of the example, produces a value that is consistent with the target tuple of the example, wherein the script is generated using a programming-by-example algorithm in which the selected row included in the example is used as an example input and the one or more selected elements of the example are used as one or more example outputs;
            for each script, apply the script to other rows of the source tuple and determine that an output generated by the script is in the target tuple;
            for each column of the target tuple, for the script for which the generated output meets a selected matching criterion when compared to the elements of the column, convey the output generated by the script for display on a display device; and
            in response to an input signal accepting the conveyed script, perform a join operation on the two tables at least in part by performing each of the accepted scripts on the source columns.

2. The computing device of claim 1, wherein the processor is configured to compute join potential between the first table and the second table in response to detecting a trigger condition.

3. The computing device of claim 1, wherein the processor is configured to normalize the elements of the columns of at least one of the source tuple and the target tuple so that they have the same data type as the elements of the columns of the other, at least in part by converting the elements into converted strings.

4. The computing device of claim 3, wherein the processor is configured to select one or more elements of at least one column of the target tuple at least in part by determining one or more elements of at least one column of the target tuple that have the same format as an element of the selected row of the source tuple.

5. The computing device of claim 4, wherein the format is selected from the group consisting of string representations of formats associated with number, date, time, name, address, email address, and distance.

6. The computing device of claim 3, wherein the processor is configured to select one or more elements of at least one column of the target tuple at least in part by determining one or more elements of at least one column of the target tuple that share a longest substring match with an element of the selected row of the source tuple.

7. The computing device of claim 3, wherein the processor is configured to determine a script of the plurality of scripts for which the generated output meets a selected matching criterion when compared to the elements in the one or more target columns, at least in part by determining that most elements in the generated output belong to the one or more target columns and by determining a relative coverage of the elements in the one or more target columns.

8. The computing device of claim 1, wherein the target tuple includes a plurality of target columns.

9. The computing device of claim 1, wherein the processor is configured to generate a profile for each column in the first table and each column in the second table, wherein the profile of each column includes one or more of a minimum string length, maximum string length, mean string length, data types of the elements of the column, and delimiters contained within the elements of the column, and wherein the processor is configured to use the profiles of each column in the first table and each column in the second table to determine a probability of a successful join operation between the columns.

10. The computing device of claim 1, wherein the processor is configured to programmatically pre-compute one or more possible join operations, and wherein the performed join operation is one of the one or more possible join operations.

11. The computing device of claim 1, wherein the outputs of the scripts for which the generated outputs meet a selected matching criterion when compared to the elements of the columns of the target tuple are conveyed in one joined table.

12. A method for use with a computing device for computing join potential between a first table and a second table, comprising:
    selecting at least one pair of tuples of columns, wherein each pair includes a source tuple of a plurality of columns from a plurality of source columns of the first table and a target tuple of at least one column from one or more target columns of the second table;
    for each pair:
        selecting one or more rows, wherein each selected row includes an element from each column of the source tuple;
        selecting one or more elements of at least one column of the target tuple;
        for each selected row, generating an example that includes the selected row and the one or more selected elements;

for each example, based on the example programmatically generating a script that when performed on the source tuple of the selected pair of tuples of the example, produces a value that is consistent with the target tuple of the example, wherein the script is generated using a programming-by-example algorithm in which the selected row included in the example is used as an example input and the one or more selected elements of the example are used as one or more example outputs;

for each script, applying the script to other rows of the source tuple and determining that an output generated by the script is in the target tuple;

for each column of the target tuple, for the script for which the generated output meets a selected matching criterion when compared to the elements of the column, conveying the output generated by the script for display on a display device; and in response to an input signal accepting the conveyed script, performing a join operation on the two tables at least in part by performing each of the accepted scripts on the source columns.

13. The method of claim 12, wherein the elements of the columns of at least one of the source tuple and the target tuple are normalized so that they have the same data type as the elements of the columns of the other, at least in part by converting the elements into converted strings.

14. The method of claim 13, wherein one or more elements of at least one column of the target tuple are selected at least in part by determining one or more elements of at least one column of the target tuple that have the same format as an element of the selected row of the source tuple.

15. The method of claim 13, wherein one or more elements of at least one column of the target tuple are selected at least in part by determining one or more elements of at least one column of the target tuple that share a longest substring match with an element of the selected row of the source tuple.

16. The method of claim 13, wherein a script of the plurality of scripts is determined for which the generated output meets a selected matching criterion when compared to the elements in the one or more target columns, at least in part by determining that most elements in the generated output belong to the one or more target columns and by determining a relative coverage of the elements in the one or more target columns.

17. The method of claim 12, wherein a profile is generated for each column in the first table and each column in the second table, wherein the profile of each column includes one or more of a minimum string length, maximum string length, mean string length, data types of the elements of the column, and delimiters contained within the elements of the column, and wherein the profiles of each column in the first table and each column in the second table are used to determine a probability of a successful join operation between the columns.

18. The method of claim 12, wherein one or more possible join operations are programmatically pre-computed, and wherein the performed join operation is one of the one or more possible join operations.

19. A computing device for computing join potential between a first table and a second table, comprising:

a processor configured to:

select at least one pair of tuples of columns, wherein each pair includes a source tuple of a plurality of columns from a plurality of source columns of the first table and a target tuple of at least one column from one or more target columns of the second table;

normalize the elements of the columns of at least one of the source tuple and the target tuple so that they have the same data type as the elements of the columns of the other, at least in part by converting the elements into converted strings;

for each pair:

select one or more rows, wherein each selected row includes an element from each column of the source tuple;

select one or more elements of at least one column of the target tuple;

for each selected row, generate an example that includes the selected row and the one or more selected elements;

for each example, based on the example programmatically generate a script that, when performed on the source tuple of the selected pair of tuples of the example, produces a value that is consistent with the target tuple of the example, wherein the script is generated using a programming-by-example algorithm in which the selected row included in the example is used as an example input and the one or more selected elements of the example are used as one or more example outputs;

for each script, apply the script to other rows of the source tuple and determine that an output generated by the script is in the target tuple;

for each column of the target tuple, for the script for which the generated output meets a selected matching criterion when compared to the elements of the column, convey the output generated by the script for display on a display device, wherein the outputs of the scripts for which the generated outputs meet a selected matching criterion when compared to the elements of the columns of the target tuple are conveyed in one joined table; and in response to an input signal accepting the conveyed script, perform a join operation on the two tables at least in part by performing each of the accepted scripts on the source columns.

* * * * *